COMPATIBLE SINGLE SIDEBAND RADIO TRANSMISSION SYSTEM

Filed March 25, 1963

2 Sheets-Sheet 1

Inventor
JEAN J. MULLER
By [signature]
Attorney

Inventor
JEAN J. MULLER
By [signature]
Attorney

United States Patent Office 3,277,376

Patented Oct. 4, 1966

3,277,376

COMPATIBLE SINGLE SIDEBAND RADIO TRANSMISSION SYSTEM

Jean Jacques Muller, Boulogne-Billancourt, France, assignor to International Standard Electric Corporation, New York, N.Y., a corporation of Delaware Filed Mar. 25, 1963, Ser. No. 267,649
Claims priority, application France, Mar. 29, 1962, 892,750, Patent 1,330,165
10 Claims. (Cl. 325—137)

The present invention relates to compatible single sideband (SSB) transmission systems, i.e. transmission systems of the A3*a* type having an SSB signal with a reduced carrier, in which the A3*a* SSB signal is modified in order that a double band amplitude detection receiver of the A3 (double sideband, full carrier) type can receive it with a low distortion.

These systems provide the benefit of the well known advantages of the SSB transmission while utilizing conventional double band receivers as receivers. They may be utilized for broadcasting purposes where the installation of a modified SSB transmitter, which is more expensive and more intricate than conventional double sideband or SSB transmitters, is acceptable, since they do not require the modification of existing conventional receivers.

There has been proposed to transmit the carrier with its full amplitude of 1 and a single sideband having a peak amplitude of 1 (A3H transmission mode: SSB with a non suppressed carrier). Such a signal may be received practically without distortion by an amplitude detection receiver when the modulation rate of the sideband is low. However, when this rate becomes high, an important harmonic distortion will appear at the reception.

It is also well known that an A3 signal can be emitted by an SSB transmitter by separately creating the carrier of amplitude 1 and two sidebands of amplitude ½, but two sideband filters are needed in this case; now, most of the mobile transmitters have only one sideband filter. The A3 carrier power thus obtained is equal to ¼ of the peak envelope power and the power of each sideband is $\frac{1}{16}$th of said peak power.

There has been proposed to transmit a compatible signal by modifying a double sideband conventional transmitter, for instance in the article entitled "Compatible Single Sideband" described by Leonard R. Kahn in "Proceedings of the IRE" of October 1961.

Finally, there is known a process for transmitting compatible signals by utilizing a single sideband transmitter. It is known that an SSB signal may be considered as the product of two components, one being a phase modulated component and the other an amplitude-modulated component (the latter component having a greater difference from the modulating signal as the modulating rate is increased). In this process, the harmonics of the amplitude-modulated component are suppressed to make the transmitted signal more compatible.

According to a feature of the present invention, a compatible signal is obtained by combining a single sideband signal with a correction signal wherein the harmonics of the amplitude-modulated component of the single sideband signal have been modified.

According to another feature of the invention, there is provided a transmitter able to transmit a single sideband wave with a non-suppressed carrier, and this transmitter, in order to obtain compatible transmitted signals, is provided with an equipment comprising means for separately obtaining the amplitude-modulated component and the phase modulated component of the single sideband signal, means for extracting the harmonic content from the amplitude-modulated component, and a modulator for recombining said harmonic content only with the phase modulated component, the correction signal provided by said modulator being combined in opposite phase with the single sideband signal before the transmitter final amplifier stage.

According to another feature of the invention, the equipment intended for rendering the signals compatible comprises means for obtaining the amplitude-modulated component, means for extracting therefrom the harmonic content, and a modulator to combine said harmonic content with the carrier wave, the signal of said modulator being injected as previously.

According to another feature of the invention, the spectrum of the signal provided by said modulator is limited in a low-pass or pass-band filter so that the correction signal is entirely within the frequency band of an equivalent double sideband signal, and almost the total energy of the transmitted signal is within the considered single sideband.

Other objects and features of the present invention will become apparent from the following description of embodiments with reference to the accompanying drawings, wherein.

Figures 1, 2, 3:
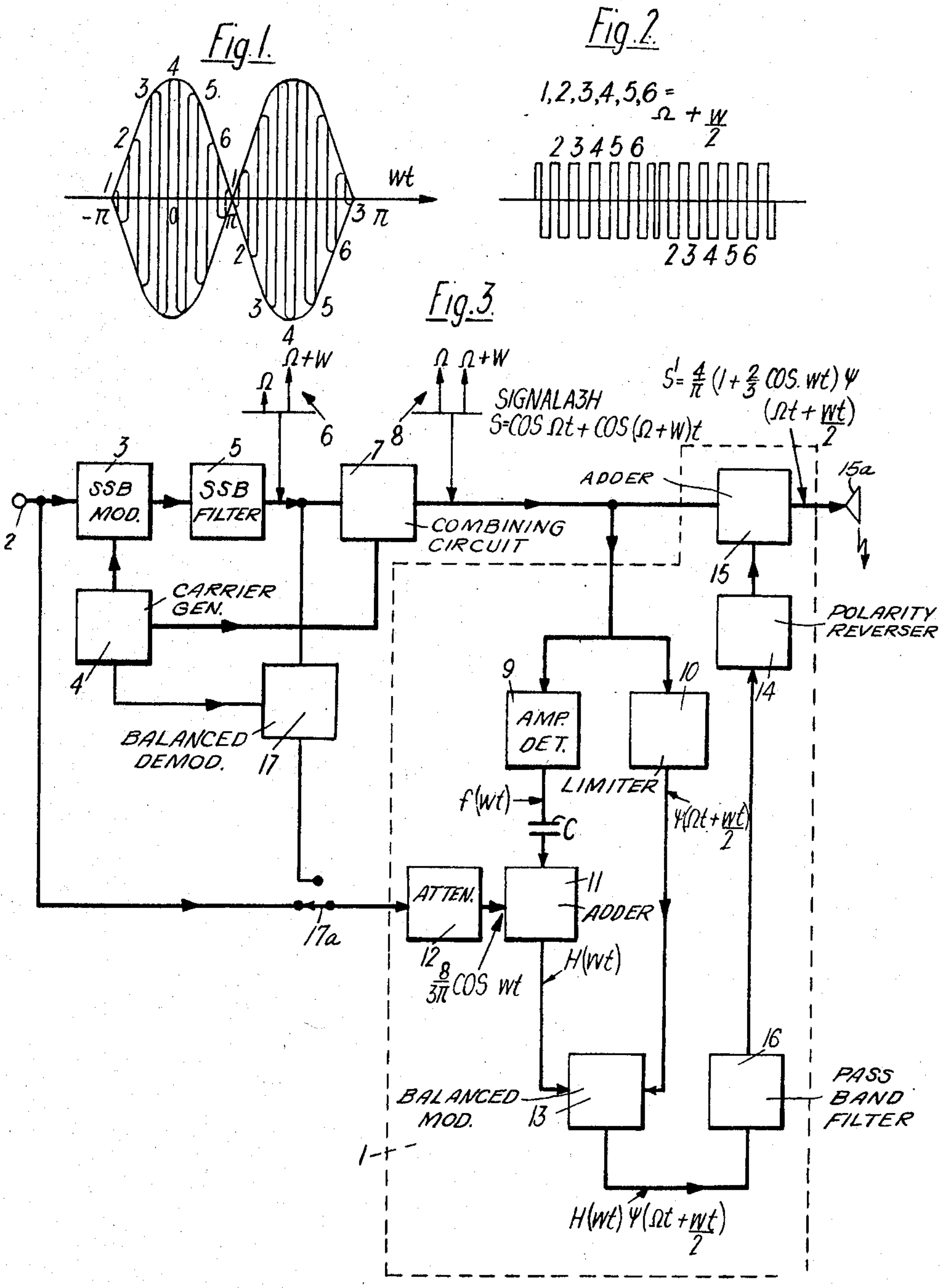
FIGURES 1 and 2 represent a single sideband signal before and after limiting.
FIGURE 3 represents an embodiment according to the invention.

Let us consider a single sideband signal:

If the modulating signal is a pure sinusoidal wave of angular frequency $\omega$ and amplitude 1, and if the angular frequency of carrier of amplitude 1 is $\Omega$, the transmitted signal will be written in the form:

$$S=2\cos\frac{\omega t}{2}\quad\cos\left(\Omega t+\frac{\omega t}{2}\right)\tag{1}$$

The envelope of the high frequency signal has an angular frequency $\omega$ and the signal detected by an amplitude detector is represented by:

$$2\left|\cos\frac{\omega t}{2}\right|=f(\omega t)$$

the Fourier development of which is as follows:

$$f(\omega t)=\frac{4}{\pi}+\frac{8}{3\pi}\cos\omega t-\frac{8}{15\pi}\cos 2\omega t+\frac{8}{35\pi}\cos 3\,\omega t$$
$$+(-1)^{n+1}\frac{2}{\pi\left(n^2-\frac{1}{4}\right)}\cos n\,\omega t$$
$$=\frac{4}{\pi}+\frac{8}{3\pi}\cos\omega t+H(\omega t)$$

The transmitted signal is equivalent to the signal which would be obtained by amplitude modulating a carrier of frequency $$\Omega+\frac{\omega}{2}$$

and amplitude 1 by the function $f(\omega t)$, comprising a constant term $4/\pi$, a useful signal at frequency $\omega$ of amplitude $8/3\pi$ and an unlimited series of harmonics represented above by $H(\omega t)$. But the considered carrier would effect a phase change of $\pi$ at each zero crossing of the signal $\cos\omega t/2$. Let us term $$\psi\left(\Omega t+\frac{\omega t}{2}\right)$$

this carrier.

The function $\psi$ is written:

$$\psi\left(\Omega t+\frac{\omega t}{2}\right)=\cos\left(\Omega t+\frac{\omega t}{2}+i\pi\right)\text{ with }\begin{cases} i=0 \text{ for } \cos\frac{\omega t}{2}>0 \\ i=1 \text{ for } \cos\frac{\omega t}{2}<0 \end{cases}$$

developed in Fourier series, the function is written as follows:

$$\psi=\frac{2}{\pi}\cos\Omega t\ .\ .\ .+(-1)^{n+1}\frac{2}{\pi}\frac{1}{2n-1}\cos(\Omega+n\omega)t$$
$$-(-1)^{n+1}\frac{2}{\pi}\frac{1}{2n+1}\cos(\Omega-n\omega)t$$

The transmitted signal is termed:

$$f(\omega t).\ \psi\left(\Omega t+\frac{\omega t}{2}\right)$$

Otherwise stated, the signal may be written in the form of the product of an amplitude modulated component $f(\omega t)$ and a phase modulated component $$\psi\left(\Omega t+\frac{\omega t}{2}\right)$$

It is to be noted that although $f(\omega t)$ and $$\psi\left(\Omega t+\frac{\omega t}{2}\right)$$

each comprise an infinite series of harmonics, the transmitted signal, however, is constituted by two discrete spectral lines, and two only, this being due to the definition of functions $f$ and $\psi$.

According to the invention, by generating a carrier, identical with that just described by function $\psi$, which is only modulated by harmonics $H(\omega t)$, in phase opposition with the harmonics of signal $f(\omega t)$, and by adding this signal to signal S, there is obtained:

$$S'=f(\omega t)\psi\left(\Omega t+\frac{\omega t}{2}\right)-H(\omega t)\psi\left(\Omega t+\frac{\omega t}{2}\right) \quad (2)$$

or $$S'=\frac{4}{\pi}\left(1+\frac{2}{3}\cos\omega t\right)\psi\left(\Omega t+\frac{\omega t}{2}\right) \quad (2')$$

An amplitude detector which does not detect the phase changings of signal $\psi$ then receives a signal equivalent to that produced by a carrier with an amplitude $4/\pi$ modulated at the rate of 66.6%.

Thus, the carrier power would be (referred to peak power 4):

$$\frac{16}{\pi^2}\times 4=\frac{4}{\pi^2}$$

of the peak power, and the power in each sideband would be:

$$\frac{4}{\pi^2}\times\frac{1}{9}$$

of the peak power.

FIGURE 3 schematically represents an embodiment of a compatible SSB signal transmitter according to the invention. The transmitter comprises the units which are able to transmit a single sideband signal having a non suppressed carrier, and the additional equipment 1 defined above.

The audio frequency input signal $\cos\omega t$ is applied through terminal 2 to single sideband modulator 3, the carrier wave generator 4 is connected to the other input of said modulator 3 which is followed by a single sideband filter circuit 5 at the output of which the signal spectrum has the form represented in 6. Signal 6 and the carrier wave from generator 4 are combined in circuit 7 the output signal of which has a spectrum represented in 8. Then, said signal may be applied to a linear amplifier, not shown, the output of which is connected to a transmitting antenna.

For obtaining the compatible SSB signal according to the invention, signal S of spectrum 8 is applied, on the one hand to detector 9 and, on the other hand, to limiter 10 of additional equipment 1. At the output of detector 9, the amplitude modulated component $f(\omega t)$ is obtained whereas at the output of limiter 10, the phase modulated component $$\psi\left(\Omega t+\frac{\omega t}{2}\right)$$

The component $f(\omega t)$ is applied to adder 11 through condenser C which eliminates the constant $4/\pi$ of this component. On the other hand, adder 11 receives the audio frequency input signal $\cos\omega t$ bearing the coefficient $8/3\pi$ when passing through attenuator 12. Adder circuit 11 performs the operation:

$$\left(f(\omega t)-\frac{4}{\pi}\right)-\frac{8}{3\pi}\cos\omega t=H(\omega t)$$

At the output of adder 11, there is thus obtained the harmonic part $H(\omega t)$ which is applied to an input of symmetrical modulator 13, the second input of which receives the component $\psi$. The output signal of modulator 13 is the product of function H by function $\psi$. Said signal is applied to a polarity reverser 14 the output of which is connected to adder 15. The other input of adder 15 receives signal S of spectrum 8 from circuit 7. At the output of adder 15, there is thus obtained the above mentioned signal S' which is compatible according to the above mentioned definition. Signal S' is coupled to a transmitting antenna 15*a* possibly through a linear amplifier (not shown) if amplification is necessary.

Limiter 10 gives the function $$\psi\left(\omega t+\frac{\omega t}{2}\right)$$

by clipping the high frequency cycles of signal S for obtaining constant amplitude square signals the phase of which is unaltered.

FIGURES 1 and 2 represent signal S before and after limiting. They display the phase-shifts $\pi$ between the cycles corresponding to positive and negative values of $\cos(\omega t/2)$. The square signal of FIGURE 2 supposes a perfect limiter. In fact, near $\cos(\omega t/2)=0$, a part of signal S is not limited by an imperfect limiter, but it can be shown that the fraction of the whole power of the signal after limiting corresponding to this non limited part of signal S tends towards 0 when the efficiency of the limiter increases.

It will be clear that for reaching this result, the transmitter has to transmit all the harmonics contained in $$\mathrm{H}(\omega t)\cdot\psi\left(\Omega t+\frac{\omega t}{2}\right)$$

This cannot be accepted from the point of view of regulations in force. Therefore, it is necessary to limit the spectrum $$H(\omega t)\cdot\psi\left(\Omega t+\frac{\omega t}{2}\right)$$

to the frequencies of the transmitted band. Therefore, the pass-band filter is coupled between modulator 13 and adder 15 which cuts off for instance at ±4 kHz. According to the cut-off frequency and the response characteristic of said filter, it will be possible to obtain various compromises between the distortion and the out of band radiation. It is to be noted that this possibility has an advantage over the formerly proposed systems as it is only necessary to add to a single sideband signal, i.e. to a signal with a well defined band width, a correcting signal the pass-band of which may be controlled. In the former systems, the two signals to be combined before emission have wide spectra and the combination can eliminate out of band radiation only with the help of high-pass filters, i.e. complex filters. Moreoper, phase adjustments are needed.

An examination of spectrum $H(\omega t)$ will specify the advantage of this process.

The table hereinafter indicates the amplitudes of the first 14 harmonics of $f(\omega t)$:

| Frequency | | Value compared with the fundamental, percent |
|---|---|---|
| H1 | $8/\pi \times 1/3$ | 100 |
| H2 | 1/15 | 20 |
| H3 | 1/35 | 8.6 |
| H4 | 1/63 | 4.7 |
| H5 | 1/99 | 3 |
| H6 | 1/143 | 2.1 |
| H7 | 1/195 | 1.4 |
| H8 | 1/255 | 1.2 |
| H9 | 1/323 | 0.9 |
| H10 | 1/399 | 0.7 |
| H11 | 1/483 | 0.6 |
| H12 | 1/575 | 0.5 |
| H13 | 1/675 | 0.4 |
| H14 | 1/783 | 0.4 |

The second harmonic alone represents 20% of the fundamental frequency while the total harmonic rate calculated according to the above table is superior to 23% of the fundamental frequency but inferior to 25% (of the fundamental frequency by estimating the sum of the subsequent terms of the series). Now, the speech transmitted by A3H transmission mode is still relatively intelligible without special correcting step, the reason being that a speech signal contains multiple frequencies each of which separately modulates the carrier signal, but not very much. The sum of these separate modulations seldom reaches 100%. Through the process described above, if it is possible to correct the harmonics of the low and medium fundamental frequencies from 300 to about 1700 Hz, an improvement in the transmission quality is to be expected, since the harmonics of the fundamental frequencies greater than 1700 Hz are not usually received. Moreover, this process is also valid for transmission of music or any other signal, the bandwidth being suitably chosen.

Although the necessary means are not represented on FIGURE 3, it will be understood that the connections between the additional equipment 1 and the other parts of transmitter are in fact connections able to be switched permitting on the one hand the operation of the transmitter as a conventional SSB transmitter or, at will, as a compatible SSB transmitter.

According to an alternative of an embodiment of the invention, the signal $-8/3\pi \cos \omega t$ may be derived from the signal with spectrum 6 by demodulation in order to eliminate the phase-shifts introduced by filter 5. For this purpose, there is provided a demodulator 17 connected to generator 4 and filter 5 and to attenuator 12 through switch 17*a*.

Although the calculation has been made by assuming a carrier to sideband ratio of 1, the same process may be applied to different carrier to sideband ratios; more particularly, it is possible to reduce the carrier below the amplitude 1 in order to increase the power in the useful sideband.

The added circuits, more particularly detector 10, limiter 9, balanced modulator 13 and passband filter 16 with fixed central frequency (for instance 100 kHz) have to be compared with additional circuits which would be needed for passing from mode A3*a* to obtain compatibility by transmission of the two sidebands and of the carrier. It is to be noted that the added circuits may be realized in a relative simple manner: even if there was an error of 10% in the compensation of the two first harmonics which are at a level of 20% and 8.6%, the final distortion rate would be reduced from 24% to 6.8% for a modulation rate of 100%.

Figure 4:
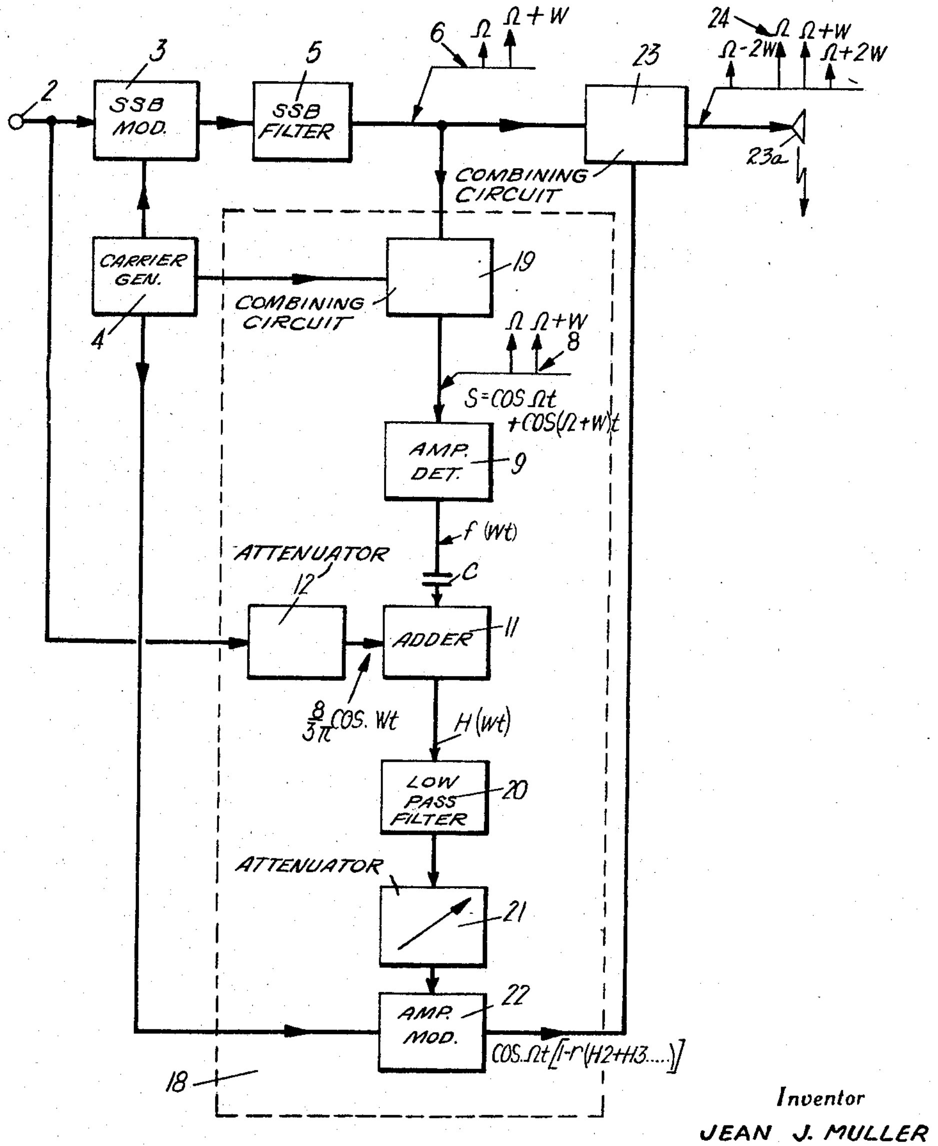
FIGURE 4 represents another embodiment according to the invention.

Another embodiment of the invention is shown in FIGURE 4. In fact, it is to be noted that the development of the product:

$$-H(\omega t)\cdot\psi\left(\Omega t+\frac{\omega t}{2}\right)$$

comprises second order sidebands the amplitudes of which are:

$$A_{-2}=\frac{16}{\pi^2}\cdot\frac{1}{30}\cdot\left(1+\frac{1}{9}-\sum_{P=3}^{\infty}\frac{150}{(4p^2-1)}\;\frac{1}{(4p^2-25)}\right)$$

$$A_{+2}=\frac{16}{\pi^2}\cdot\frac{1}{30}\cdot\left(1-\frac{1}{7}+\sum_{P=3}^{\infty}\frac{90}{(4p^2-1)}\;\frac{1}{(4p^2-9)}\right)$$

These two terms have the same sign and their values are:

$$A_{-2}=0.034 \qquad A_{+2}=0.055$$

which means that the amplitude of the upper and lower sidebands are 5.5% and 3.4% of the reference carrier level 1.

According to the invention, an approximation is made to replace these two sidebands of unequal amplitudes by two sidebands having the same sign and equal amplitude. The replacing sidebands are obtained by modulating $\cos \Omega t$ by $H(\omega t)$ at rate $-r$ to be experimentally determined with an optimum value near $-0.5$ corresponding to the average of the two bands A−2 and A+2.

In FIGURE 4, the elements common to FIGURES 3 and 4 have the same references as in FIGURE 3. The low frequency input signal $\cos \omega t$ is applied through terminal 2 to modulator 3. The signal then passes through filter 5 and provides at its output a signal having the form of spectrum 6. A portion of signal 6 is transmitted to circuit 23 while the other portion is transmitted towards the additional equipment 18. Signal 6 is combined with the carrier wave from generator 4 in circuit 19 wherein a signal S of spectrum 8 is generated. As previously, signal S is processed in an amplitude detector 9 at the output of which the component $f(\omega t)$ appears. Condenser C eliminates from said component the D.C. portion $4/\pi$. Said component is then combined in circuit 11 with the signal from attenuator 12 which has the same function as previously. The output signal $H(\omega t)$ from circuit 11 is then applied to the input of low-pass filter circuit 20 and, hence, to attenuator 21 with attenuation coefficient $-r$. The output of circuit 21 is combined with the carrier coupled from generator 4 in an amplitude modulator 22. The output signal of modulator 22 may be represented by:

$$\cos\Omega t[1-r(H2+H3\ .\ .\ .\ )]$$

and is applied to an input of the combination circuit 23 the output signal of which has the spectrum represented in 24. Said signal 24 is coupled to a transmitting antenna 23*a* possibly through a linear amplifier (not shown) if amplification is necessary.

As is obvious, this second embodiment is simpler than the first one since the use of limiter 10 is eliminated.

While the principles of the invention have been described above in connection with specific embodiments, it is to be clearly understood that this description is made only by way of example and not as a limit to the scope of the invention.

What I claim is:

1. A compatible single sideband transmission system comprising:

a source of modulating signal;

first means coupled to said source to generate a single sideband signal including a full amplitude carrier, an amplitude modulated component and a phase modulated component;

second means coupled to said first means to detect said amplitude modulated component;

third means coupled to said second means and said first means to derive a correction signal proportional to the harmonic content of said detected amplitude modulated component;

fourth means coupled to said third means and said first means to combine said single sideband signal with said correction signal to modify the harmonic content of said amplitude modulated component contained in said single sideband signal and produce a compatible signal sideband signal; and an antenna coupled to said fourth means for transmission of said compatible single sideband signal.

2. A compatible single sideband transmission system comprising:

a source of modulating signal;

a single sideband generator coupled to said source to generate a first single sideband signal having a suppressed carrier;

first means coupled to said generator to convert said first single sideband signal to a second single sideband signal including a full amplitude carrier, an amplitude modulated component and a phase modulated component;

second means coupled to said first means to detect said amplitude modulated component;

third means coupled to said second means, said source of modulating signal and said first means to derive a correction signal proportional to the harmonic content of said detected amplitude modulated component;

fourth means coupled to said third means and said first means to combine said second single sideband signal with said correction signal to modify the harmonic content of said amplitude modulated component contained in said second single sideband signal and produce a compatible single sideband signal; and an antenna coupled to said fourth means for transmission of said compatible single sideband signal.

3. A system according to claim 2, wherein said generator includes a carrier signal source;

said first means includes a first combining circuit coupled to the output of said generator and said carrier signal source to produce said second single sideband signal;

said second means includes an amplitude detector coupled to said first combining circuit;

said third means includes a first adder;

a capacitor coupling the output of said amplitude detector to one input of said adder, an attenuator having a predetermined attenuation coupled to the other input of said adder, means to couple said attenuator to said source of modulating signal, a limiter coupled to said first combining circuit to detect said phase modulated component, a balanced modulator coupled to the output of said first adder and the output of said limiter, and a polarity reverser coupled to the output of said balanced modulator; and said fourth means includes a second adder coupled to said first combining circuit and said polarity reverser.

4. A system according to claim 3, wherein said third means further includes a pass band filter having a predetermined pass band coupled between said balanced modulator and said polarity reverser.

5. A compatible single sideband transmission system comprising:

a source of modulating signal;

a single sideband generator coupled to said source to generate a first single sideband signal having a suppressed carrier;

first means coupled to said generator to convert said first single sideband signal to a second single sideband signal including a full amplitude carrier, an amplitude modulated component and a phase modulated component;

second means coupled to said first means to detect said amplitude modulated component;

third means coupled to said second means, said generator and said first means to derive a correction signal proportional to the harmonic content of said detected amplitude modulated component;

fourth means coupled to said third means and said first means to combine said second single sideband signal with said correction signal to modify the harmonic content of said amplitude modulated component contained in said second single sideband and produce a compatible single sideband signal; and an antenna coupled to said fourth means for transmission of said compatible single sideband signal.

6. A system according to claim 5, wherein said generator includes a carrier signal source;

said first means includes a first combining circuit coupled to the output of said generator and said carrier signal source to produce said second single sideband signal;

said second means includes an amplitude detector coupled to said first combining circuit;

said third means includes a first adder, a capacitor coupling the output of said amplitude detector to one input of said adder, an attenuator having a predetermined attenuation coupled to the other input of said adder, a balanced demodulator coupled to said generator and said carrier signal source, means to couple said attenuator to said balanced demodulator, a limiter coupled to said first combining circuit to detect said phase modulated component, a balanced modulator coupled to the output of said first adder and the output of said limiter, and a polarity reverser coupled to the output of said balanced modulator; and said fourth means includes a second adder coupled to said first combining circuit and said polarity reverser.

7. A system according to claim 6, wherein said third means further includes a pass band filter having a predetermined pass band coupled between said balanced modulator and said polarity reverser.

8. A compatible single sideband transmission system comprising:

a source of modulating signal;

a single sideband generator coupled to said source to generate a first single sideband signal having a suppressed carrier;

first means coupled to said generator to convert said first single sideband signal to a second single sideband signal including a full amplitude carrier, an amplitude modulated component and a phase modulated component;

second means coupled to said first means to detect said amplitude modulated component;

third means coupled to said second means, said source of modulating signal and said generator to derive a correction signal proportional to the harmonic content of said detected amplitude modulated component;

fourth means coupled to said third means and said generator to combine said first single sideband signal with said correction signal to modify the harmonic content of said amplitude modulated component contained in said first single sideband signal and produce a compatible single sideband signal; and an antenna coupled to said fourth means for transmission of said compatible single sideband signal.

9. A system according to claim 8, wherein said generator includes a carrier signal source;

said first means includes a first combining circuit coupled to the output of said generator and said carrier signal source to produce said second single sideband signal;

said second means includes an amplitude detector coupled to said first combining circuit;

said third means includes a first adder, a capacitor coupling the output of said amplitude detector to one input of said adder, an attenuator having a predetermined attenuation coupled to the other input of said adder, means to couple said attenuator to said source of modulating signal, a variable attenuator having a predetermined variable attenuation coefficient coupled to the output of said adder, and an amplitude modulator coupled to said variable attenuator and said carrier signal source; and said fourth means includes a second combining circuit coupled to the output of said generator and the output of said amplitude modulator.

10. A system according to claim 9, wherein said third means further includes a low pass filter having a predetermined pass band coupled between said first adder and said variable attenuator.

References Cited by the Examiner

UNITED STATES PATENTS

| | | | |
|---|---|---|---|
| 2,298,930 | 10/1942 | Decino | 332—37 |
| 2,849,537 | 8/1958 | Eglin | 325—65 |
| 2,989,707 | 6/1961 | Kahn | 332—45 |
| 3,085,203 | 4/1963 | Logan et al. | 325—50 |

OTHER REFERENCES

Powers, K. H.: "The Compatibility Problem in Single-Sideband Transmission," Proceedings of the IRE, August 1960, pp. 1431–1435.

DAVID G. REDINBAUGH, *Primary Examiner.*

B. V. SAFOUREK, *Assistant Examiner.*